Figure 1:
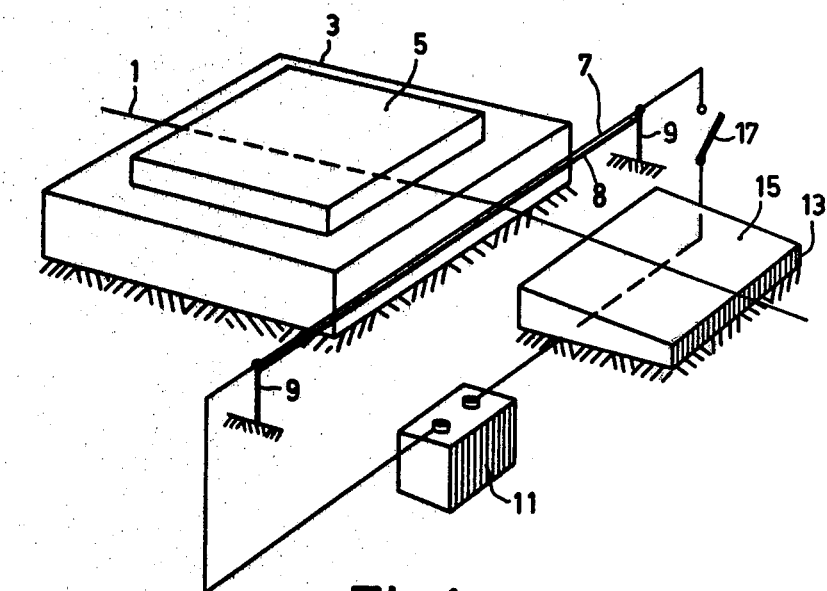

United States Patent [19]
van Hoppe

[11] 4,146,374
[45] Mar. 27, 1979

[54] METHOD OF BREAKING GLASS FIBERS

[75] Inventor: Wilhelmus J. J. van Hoppe, Eindhoven, Netherlands

[73] Assignee: U.S. Philips Corporation, New York, N.Y.

[21] Appl. No.: 844,747

[22] Filed: Oct. 25, 1977

[30] Foreign Application Priority Data

Nov. 1, 1976 [NL] Netherlands ..................... 7612081

[51] Int. Cl.$^2$ ............... C03B 21/02; C03B 33/06
[52] U.S. Cl. .......................................... 65/2; 65/4 B; 65/56; 65/105; 65/112; 65/DIG. 7; 225/2; 225/96.5
[58] Field of Search ............... 65/2, 4 B, 56, 105, 65/112, 174; 225/2, 96.5

[56] References Cited

U.S. PATENT DOCUMENTS

| | | | |
|---|---|---|---|
| 1,194,124 | 8/1916 | Barrow | 65/112 |
| 3,839,006 | 10/1974 | Pikor | 65/105 X |
| 3,934,773 | 1/1976 | Chinnock et al. | 225/2 |
| 4,017,013 | 4/1977 | Hawk et al. | 225/96.5 |
| 4,036,419 | 7/1977 | Hensel et al. | 225/96.5 |
| 4,039,309 | 8/1977 | Albanese | 65/2 |

*Primary Examiner*—Robert L. Lindsay, Jr.
*Attorney, Agent, or Firm*—Thomas A. Briody

[57] ABSTRACT

A method of breaking glass fibers in which the fiber is locally heated by means of a heating wire and kinked through a predetermined angle. As a result, an impression of the heating wire is formed on the fiber. The fiber is subsequently cooled so as to retain the kinked condition. A slight tensile stress is applied so as to obtain a stress distribution which decreases across the fiber cross-section, and the fiber is broken at the location of the kink.

3 Claims, 3 Drawing Figures

METHOD OF BREAKING GLASS FIBERS

The invention relates to a method of breaking glass fibers destined for optical communication, a fiber to be broken being deformed in such a way that in the fiber a tensile stress is produced which decreases across the cross-section and fracture of the fiber being initiated by a score at the location of maximum tensile stress and the fiber being fractured at the location of the score.

Fibers destined for use in optical communication systems must comply with special requirements. As an example, the surfaces of the fiber ends should be as smooth as possible in order to minimize losses at the coupling between laser-fiber and fiber-fiber.

A glass rod generally tends to break in such a way that the fracture surface has three zones: a mirror zone of optical surface quality, a hackle zone and a mist zone which constitutes the transistion between the mirror zone and the hackle zone. This phenomenon which also occurs when glass fibers are broken, is described comprehensively in the article by Johnson and Holloway: "On the Shape and Size of the Fracture Zones on Glass Fracture Surfaces" which appeared in the British magazine "Philosophical Magazine," no. 14, October 1966, pages 731 to 743.

For most applications in optical communication systems the entire fracture surface of the fiber must be constituted by a mirror zone, while furthermore in many cases stringent requirements are imposed on the perpendicular orientation of the fracture surface relative to the fiber axis.

From the previously mentioned publication an equation is known which relates the shape and size of the mirror zone to the stress distribution across the fiber cross-section before the initiation of fracture. For all points P of the mirror zone:

$$Z_p r^{\frac{1}{2}} = C \ [N/mm^{3/2}]$$

where
- $Z_p$ is the force component normal to the fracture plane of the local stress at the point P before the initiation of fracture;
- $r$ is the distance from the origin of fracture to the point P;
- $C$ is a material constant.

In order to obtain a fracture surface solely having a mirror zone any point P on the fracture surface should meet the requirement:

$$Z_p \cdot r^{\frac{1}{2}} < C$$

An other limiting factor is that the value of Zp for an arbitrary point P should not decrease to zero or even become negative, because otherwise fracture will continue in a direction which is not perpendicular to the fiber axis; a so-called lip may then be formed on one of the fiber ends.

A method in accordance with the above description is known from the article by Gloge et al: "Optical Fiber End Preparation for Low-Loss Splices," published in the American journal "The Bell System Technical Journal," Vol. 52, No. 9, November 1973; in accordance with this known method a specific decreasing stress distribution across the fiber cross-section is obtained by bending the fiber over a convex surface in order to obtain a low value of Sp r$^{\frac{1}{2}}$; fracture is then initiated by scoring the bent portion of the fiber.

A drawback of this known method is that the fiber is mechanically scored with the aid of a diamond or sapphire cutter, so that residual particles of scored fibre material may contaminate the fracture face. Moreover, a precision tool is required, for carrying out this known method, which complicates the use of the method in the field or even renders it impracticable.

It is an object of the invention to provide a method which is simpler than the known method, which demands no special skill and which can be carried out with a very simple tool, so that it is particularly suitable for use in the field. According to the principal characteristic feature of the invention this object is achieved in that the fiber is locally heated by means of a heating element, is bent around the heating element and kinked through a predetermined angle, an impression of the heating element being formed on the fiber at the location of the kink, subsequently the kinked condition of the fiber being rendered permanent by cooling, after which as light tensile stress is applied to the fiber on both sides of the kink and the fiber is broken at the location of the impression.

Due to these steps the fiber is permanently preformed and given a shape which is suitable for producing the desired stress distribution and for fracture; at the same time the score necessary for the initiation of fracture is formed by the impression of the heating element on the fiber; however, as no fiber material is removed contamination of the fracture surface is avoided. A fiber which has thus been preformed can be broken manually or with the aid of a simple tool. The heating element should have a sharp cutting edge, in order to obtain an accurate location of the fracture surface; an accurate orientation of the fracture surface is of importance when a bundle of fibers is to be broken so as to couple the bundle to an optical device or to an otherbundle.

The fibers can be pre-treated and prepared for fracture, after which the fibers are broken simply by hand or by means of a tool at the most suitable place, for example in the field, and at the most suitable instant.

A preferred variant of the method in accordance with the invention employs a resistance wire as heating element, whose diameter is at the most equal to the fiber diameter.

A resistance wire can simply be manufactured and replaced and requires only a small current which is of significance for work in the field.

In accordance with an other preferential variant of the method in accordance with the invention a second resistance wire with a diameter of at the most 1/10 of the fiber diameter is arranged between the first resistance wire and the fiber. The second thinner resistance wire, which substantially functions as cutting edge, produces an impression of very small size on the fiber, whilst the first thicker resistance wire mainly serves for heating; the two resistance wires together function as the heating element.

Figure 2:
Figure 3:
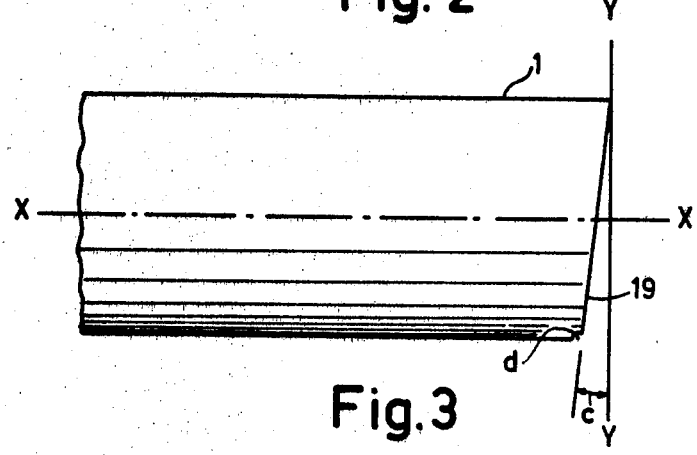

The invention will be described in more detail with reference to the drawing. In the drawing:

FIG. 1 schematically represents the preparation of a fiber in a first phase of the method in accordance with the invention, FIG. 2 shows the pre-treated fiber, FIG. 3 shows a fiber end after fracture of the fiber.

A fiber 1 to be broken is placed on a horizontal table 3 and is fixed in position, for example by means of a block 5. The fiber 1 then bears on a resistance wire 7, whose ends are fixed on two supports 9 in such a way that the wire is taut and touches the circumference of the fiber 1. The resistance wire 7 is connected to the terminals of a current source 11. Underneath the resistance wire 7 a second thicker resistance wire 8 is tensioned, which supports the resistance wire 7 over its full length. The reference numeral 13 designates a supporting block which may form part of the table 3. The supporting block 13 has an oblique supporting surface 15. The table 3, the supports 9 and the supporting block 13 are fixed relative to each other. The reference numeral 17 designates a switch.

The fiber 1 is preformed as follows:

By closing the switch 17 the clamped-in fiber 1 is heated by the resistance wires 7 and 8 at the location of the point of contact and locally softens. The fiber bends around the resistance wire 7 which functions as cutting edge, until the fiber portion which is disposed above the supporting block touches the supporting surface 15. At the location of the resistance wire 7 a kink is formed, the resistance wire 7 at the same time forming an impression d on the fiber, so that the fiber is scored without the removal of fiber material.

After the switch 7 has been opened, the fiber which has thus been preformed is allowed to cool and retains the kinked condition. FIG. 2 shows the fiber which has bent through an angle a, b referring to the kink and d to the impression on the fiber.

The fiber is preformed and kinked in such a way that by simply applying a slight tensile stress, the desired decreasing stress distribution in the fiber is produced and the fiber breaks at the location of the kink so that the fracture surfaces exhibit a mirror zone over the entire area.

FIG. 3 shows a fiber end with a fracture surface 19 which makes an angle c with the plane Y—Y at right angles to the axis X—X of the fiber 1 and with a part of the impression d.

Practical tests have been conducted with lime-glass fibers with an outer diameter D of 100$\mu$um and a core diameter K of 50$\mu$um; a single resistance wire with a diameter of 50$\mu$um was used; the fibers were bent through an angle a of 2°, so that the kinking angle was 178°; the angle c of the fracture surfaces was 1°.

What is claimed is:

1. A method of breaking optical communication glass fibers, comprising the steps of:
    locally heating said fiber by a heated resistance wire having a diameter at most equal to the diameter of said fiber;
    bending said fiber around said resistance wire to form a kink in said fiber at a predetermined angle;
    forming an impression of said resistance wire at the location of said kink;
    cooling said fiber in its kinked condition;
    applying a tensile stress to said fiber at both ends of said kink; and
    breaking said fiber at the location of said impression of said resistance wire.

2. A method of breaking optical communication glass fibers as defined in claim 1, wherein said resistance wire has a diameter of at most 1/10 of said fiber diameter.

3. A method of breaking optical communication glass fibers as defined in claim 2, further comprising the step of interposing said resistance wire between a larger auxiliary resistance wire and said fiber.

* * * * *